(12) United States Patent
Laney et al.

(10) Patent No.: US 7,583,881 B2
(45) Date of Patent: Sep. 1, 2009

(54) OPTICAL ELEMENT AND DISPLAY WITH TRANSPARENT TENSIONED SUPPORTING FILMS

(75) Inventors: Thomas M. Laney, Spencerport, NY (US); Michael R. Landry, Wolcott, NY (US); Charles C. Anderson, Penfield, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 109 days.

(21) Appl. No.: 11/749,182

(22) Filed: May 16, 2007

(65) Prior Publication Data
US 2008/0192503 A1    Aug. 14, 2008

Related U.S. Application Data

(60) Provisional application No. 60/900,895, filed on Feb. 12, 2007.

(51) Int. Cl.
  *G02B 6/10*   (2006.01)
  *F21V 7/04*   (2006.01)
  *G02F 1/1335* (2006.01)

(52) U.S. Cl. ............... 385/131; 385/129; 385/130; 385/11; 385/901; 362/608; 349/56; 349/58; 349/112

(58) Field of Classification Search ......... 385/129, 385/130, 131, 141, 11, 900, 901; 362/608, 362/311, 355; 349/122, 112, 56, 58
See application file for complete search history.

(56) References Cited

U.S. PATENT DOCUMENTS

| 2,242,567 | A   |   | 5/1941  | Bodde ................... 91/68 |
| 6,829,398 | B2  | * | 12/2004 | Ouchi ................. 385/14 |
| 7,110,177 | B2  | * | 9/2006  | Sugino et al. ......... 359/491 |
| 7,223,452 | B2  | * | 5/2007  | Murakami et al. ...... 428/1.3 |
| 2006/0082699 | A1 |   | 4/2006  | Gehlsen et al. .......... 349/61 |
| 2006/0171164 | A1 |   | 8/2006  | Kida ................... 362/608 |
| 2008/0192503 | A1 | * | 8/2008  | Laney et al. ........... 362/608 |

FOREIGN PATENT DOCUMENTS

GB        386 737    1/1933   ........... 91/68 X

OTHER PUBLICATIONS

European Search Report of corresponding European Application No. EP 08 15 1287 mailed Feb. 25, 2009.

* cited by examiner

*Primary Examiner*—Brian M Healy
(74) *Attorney, Agent, or Firm*—Edwin Oh (57) ABSTRACT

An optical element comprises a stack of at least three juxtaposed films with at least one inner optical film and two outer transparent films exhibiting high dimensional stability, wherein a controlled tensile force is applied in at least one direction to the two outer films but not the at least one inner film.

22 Claims, 3 Drawing Sheets

PLAN VIEW                    EXPLODED SIDE VIEW

OPTICAL ELEMENT AND DISPLAY WITH TRANSPARENT TENSIONED SUPPORTING FILMS

CROSS REFERENCE TO RELATED APPLICATIONS

This application claims the benefit of provisional U.S. Ser. No. 60/900,895 filed on Feb. 12, 2007.

FIELD OF THE INVENTION

The invention relates to an optical element with tensioned transparent supporting films and its use in optical displays, and more particularly to liquid crystal displays (LCDs) that may be used in LCD monitors and LCD televisions.

BACKGROUND

Liquid crystal displays (LCDs) are optical displays used in devices such as laptop computers, hand-held calculators, digital watches and televisions. Some LCDs include a light source that is located to the side of the display, with a light guide positioned to guide the light from the light source to the back of the LCD panel. Other LCDs, for example some LCD monitors and LCD televisions (LCD-TVs), are directly illuminated using a number of light sources positioned behind the LCD panel. This arrangement is increasingly common with larger displays, because the light power requirements, to achieve a certain level of display brightness, increase with the square of the display size, whereas the available real estate for locating light sources along the side of the display only increases linearly with display size. In addition, some LCD applications, such as LCD-TVs, require that the display be bright enough to be viewed from a greater distance than other applications, and the viewing angle requirements for LCD-TVs are generally different from those for LCD monitors and hand-held devices.

Some LCD monitors and most LCD-TVs are commonly illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is used to smooth the illumination profile at the back of the LCD device.

Some LCD monitors and most LCD-TVs commonly stack an arrangement of light management films adjacent to the diffuser plate on the opposite side from the lamps. These light management films generally comprise collimating diffuser films, prismatic light directing films, and reflective polarizer films. Handling of these individual light management films to manufacture LCD displays is very labor intensive as some films are supplied with protective cover sheets which must be first removed and then each light management film placed in the back light unit of the LCD individually. Also, inventory and tracking of each film individually can add to the total cost to manufacture the LCD display. Further, as these light management films are handled individually there is more risk of damage to the films during the assembly process.

Currently, LCD-TV diffuser plates typically employ a polymeric matrix of polymethyl methacrylate (PMMA) with a variety of dispersed phases that include glass, polystyrene beads, and $CaCO_3$ particles. These plates are thick and heavy while display manufacturers are always trying to thin the form factor and reduce the weight of displays. The diffuser plates often deform or warp after exposure to the elevated humidity and high temperature caused by the lamps which causes viewing defects in the displays. In addition, the diffuser plates require customized extrusion compounding to distribute the diffusing particles uniformly throughout the polymer matrix, which further increases costs.

A previous disclosure, U.S. Pat. Application No. 2006/0082699 describes one approach to reducing the cost of diffusion plates by laminating separate layers of a self-supporting substrate and an optically diffuse film. Although this solution is novel the need to use adhesives to laminate these layers together results in reduced efficiency of the system by adding light absorption materials. Also the additional processing cost to laminate the layers together is self-defeating. Also, this previous disclosure does not solve the issue of the thick form factor and heavy weight of the diffuser plate. Nor does this solution address the issue of warping of the diffuser plate.

Another previous disclosure, US Pat. Application No. 2006/0171164 describes an optical film structure or element disposed between LC panel and an illumination source. This optical element uses film fixing parts attached to the optical films which are further attached to film tension controlling members which are connected to a frame. This disclosure describes the significant advantages of such an optical element in terms of preventing distortion of the optical films by maintaining tension on the films. One disadvantage of this approach, however, is that some of the optical films to be used in a light management arrangement or stack may have poor dimensional stability in terms of shrinkage, thermal expansion, or creep. Films with poor or low dimensional stability can be prone to buckle somewhat even when tensioned. Also, US Pat. Application No. 2006/0171164 does not teach how one could eliminate the thick plate diffuser by replacing it with a diffuser film that has equivalent optical performance.

It is desirable to replace the diffuser plate with an optical diffuser film, which would have a much thinner form factor as well as significantly lower weight. Such a diffuser film must have dimensional stability as well as high optical transmission while maintaining a high level of light uniformization. Further, it is desirable for such a diffuser film to have additional heat insulation value to reduce the heat gain from the light sources to the LC layer above the diffuser. Voiding is a well-known means to achieve both the optical requirements and the insulation requirements of the diffuser film.

The diffuser film may also provide the structural support for itself and optionally for the other optical films typically used in the light management arrangement. Because some optical films may shrink significantly or expand significantly under heat or possess poor long-term dimensional stability, in terms of creep propensity when held under tension, it may be desirable to sandwich the optical films between two transparent films, one of which could be the diffuser film. Such films should shrink very little under heat and have a low thermal expansion coefficient and comprise materials that have very good long term dimensional stability under tension (low propensity to creep), such as biaxially oriented PET. It is this structural support requirement without significant shrinkage, thermal expansion, or creep that is the essence of the present invention.

Therefore, it the object of the present invention to provide an optical element comprising a stack of at least three juxtaposed films with at least one inner optical film and the two outer transparent films exhibiting relatively high dimensional stability, wherein a controlled tensile force is applied in at least one direction to the two outer films but not the inner film.

In a preferred embodiment the optical element provides the optical smoothing function of previous plate diffusers and optical film arrangements or stacks at a very low cost. The optical element is unique in that it provides a high level of optical function and meets surface flatness requirements under specified thermal and humidity testing even at low thicknesses. Typically the optical element comprises a supporting frame around the perimeter of the at least three juxtaposed films that are supported by a controlled tensile force being applied to the two outer films. Other embodiments of the invention include other light management films also constrained by the supporting frame and tensioned films. These other optical films can be placed between and supported by the two tensioned outer films.

SUMMARY OF THE INVENTION

The invention provides an optical element comprising a stack of at least three juxtaposed films with at least one inner optical film and two outer transparent films exhibiting high dimensional stability, wherein a controlled tensile force is applied in at least one direction to the two outer films but not the at least one inner film It also encompasses an optical element comprising at least three juxtaposed films wherein at least a portion of the outer films is maintained dimensionally stable by the presence of a mechanism for application of a controlled tensile force to the films wherein one of the outer films is a diffuser film that contains voids. It further encompasses an optical element comprising at least three juxtaposed films with at least one inner optical film wherein at least a portion of the outer films is maintained dimensionally stable by the presence of a mechanism for application of a controlled tensile force to the films wherein the maximum change in applied tensile force for each mechanism is less than 50% of the highest force over the expected film dimensional change for the design temperature and humidity range of the optical element.

It also provides a display and a process for emitting light uniformly. One embodiment of this invention is an optical element comprising a polymeric optical diffuser film between two transparent films with high dimensional stability which are supported by a controlled tensile force via a frame around the perimeter of the films. The tensile force is applied to the outer films, for example, by spring type mechanisms which may protrude through holes or slots at various locations around the perimeter of the film and are subsequently connected to the frame. These spring mechanisms substantially maintain a tension on the film even during environmental test conditions. This optical element is useful in replacing the optical function of diffuser plates typically used today in backlit LCD displays.

Another embodiment of this invention is an optical element comprising optical diffuser film and at least one other light management film at which are the inner films of the invention. This optical element is useful in replacing the optical function of diffuser plates and light management films typically used today in backlit LCD displays.

Another embodiment of the invention is directed to a liquid crystal display (LCD) unit that has a light source and an LCD panel that includes an upper plate, a lower plate and a liquid crystal layer disposed between the upper and lower plates. The lower plate faces the light source, and includes an absorbing polarizer. An optical element comprising an arrangement of light management films comprising a stack of at least three juxtaposed films with at least one inner optical film and two outer transparent films exhibiting relatively high dimensional stability, wherein a controlled tensile force is applied in at least one direction to the two outer transparent films but not the inner films is disposed between the light source and the LCD panel so that the light source illuminates the LCD panel through the arrangement of light management films.

The arrangement of light management films comprises a first polymeric optical diffuser film. The arrangement of light management films optionally comprises other optical layers. Other optical layers may include a bead coated collimating diffuser film, a light directing film and a reflective polarizer.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the claims.

DETAILED DESCRIPTION OF THE INVENTION

The present invention is applicable to liquid crystal displays (LCDs, or LC displays), and is particularly applicable to LCDs that are directly illuminated from behind, for example as are used in LCD monitors and LCD televisions (LCD-TVs).

The diffuser plates currently used in LCD-TVs are based on a polymeric matrix, for example polymethyl methacrylate (PMMA), polycarbonate (PC), or cyclo-olefins, formed as a rigid sheet. The sheet contains diffusing particles, for example, organic particles, inorganic particles or voids (bubbles). These plates often deform or warp after exposure to the elevated temperatures of the light sources used to illuminate the display. These plates also are more expensive to manufacture and to assemble in the final display device.

The invention is directed to a directly illuminated LCD device that has an arrangement of light management films positioned between the LCD panel itself and the light source. The arrangement of light management films includes at least a polymeric optical diffuser film possessing a specific transmission and uniformization function which is supported by a controlled tensile force via tensioning mechanisms protruding through holes or slots in the film and connected to a frame around the perimeter of the film. Optionally other optical films such as bead coated collimating diffuser films, light directing films, and reflective polarizers can be constrained by the frame or by the tensioned film or films. The transmission and haze levels of each component are designed to provide a direct-lit LC display whose brightness is relatively uniform across the display.

Preferred polymeric optical diffuser films of the present invention are simple to manufacture and provide a high degree of flexibility in the materials and processes used in manufacturing. In the present invention, the structural and optical requirements are separated: the tensioning mechanism provides the structural performance and the thin diffusing film, provides the optical performance. By separating these functions, the cost advantages of using thin diffuser sheets can be exploited, to reduce overall costs. By not including a substrate with the diffuser film a high level of optical performance and a low manufacturing cost is realized. This also prevents any warping of thick plates as the tensioned film maintains a high degree of uniformity over the design temperature and humidity range. In addition, it is easier to control the diffusion properties more precisely when the diffuser is contained in a film rather than a substrate. By using a voided diffuser film an optimal optical performance as well as a higher level of insulation can be provided at any given thickness of the diffuser.

Figure 1:
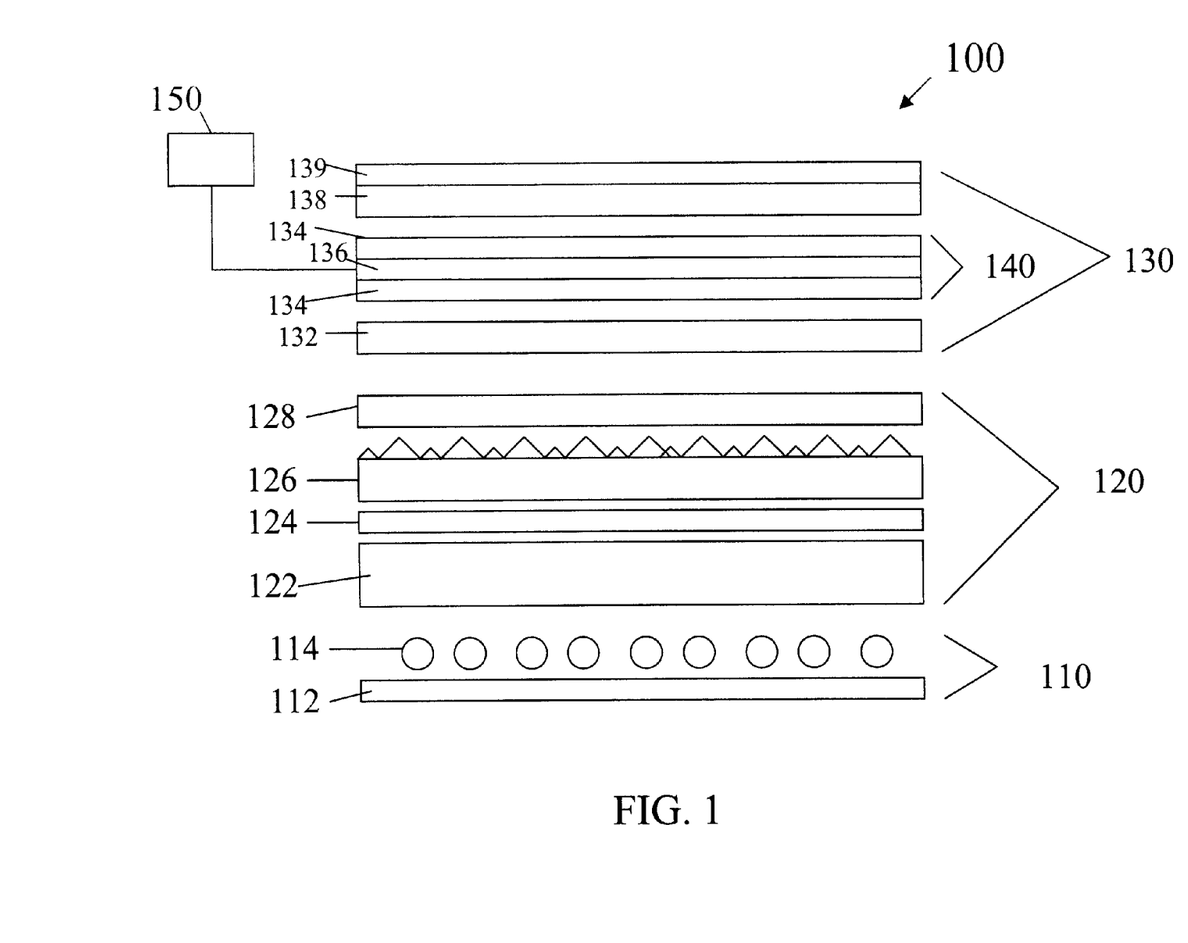
FIG. 1 schematically illustrates a typical back-lit liquid crystal display device that uses a diffuser plate.

A schematic exploded view of an exemplary embodiment of a direct-lit LC display device 100 is presented in FIG. 1. Such a display device 100 may be used, for example, in an LCD monitor or LCD-TV. The display device 100 is based on the use of a front panel assembly 130, comprising a LC panel 140, which typically comprises a layer of LC 136 disposed between panel plates 134. The plates 134 are often formed of glass, and may include electrode structures and alignment layers on their inner surfaces for controlling the orientation of the liquid crystals in the LC layer 136. The electrode structures are commonly arranged so as to define LC panel pixels, areas of the LC layer where the orientation of the liquid crystals can be controlled independently of adjacent areas. A color filter may also be included with one or more of the plates 134 for imposing color on the image displayed.

An upper absorbing polarizer 138 is positioned above the LC layer 136 and a lower absorbing polarizer 132 is positioned below the LC layer 136. The absorbing polarizers 138, 132 and the LC panel 140 in combination control the transmission of light from the backlight 110 through the display 100 to the viewer. In some LC displays, the absorbing polarizers 138, 132 may be arranged with their transmission axes perpendicular. When a pixel of the LC layer 136 is not activated, it may not change the polarization of light passing there through. Accordingly, light that passes through the lower absorbing polarizer 132 is absorbed by the upper absorbing polarizer 138, when the absorbing polarizers 138, 132 are aligned perpendicularly. When the pixel is activated, on the other hand, the polarization of the light passing there through is rotated, so that at least some of the light that is transmitted through the lower absorbing polarizer 132 is also transmitted through the upper absorbing polarizer 138. Selective activation of the different pixels of the LC layer 136, for example by a controller 150, results in the light passing out of the display at certain desired locations, thus forming an image seen by the viewer. The controller may include, for example, a computer or a television controller that receives and displays television images. One or more optional layers 139 may be provided over the upper absorbing polarizer 138, for example to provide mechanical and/or environmental protection to the display surface. In one exemplary embodiment, the layer 139 may include a hardcoat over the absorbing polarizer 138.

It will be appreciated that some type of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 110 includes a number of light sources 114 that generate the light that illuminates the LC panel 140. The light sources 114 used in a LCD-TV or LCD monitor are often linear, cold cathode, fluorescent tubes that extend across the display device 100. Other types of light sources may be used, however, such as filament or arc lamps, light emitting diodes (LEDs), flat fluorescent panels or external fluorescent lamps. This list of light sources is not intended to be limiting or exhaustive, but only exemplary.

The backlight 110 may also include a reflector 112 for reflecting light propagating downwards from the light sources 114, in a direction away from the LC panel 140. The reflector 112 may also be useful for recycling light within the display device 100, as is explained below. The reflector 112 may be a specular reflector or may be a diffuse reflector. One example of a specular reflector that may be used as the reflector 112 is Vikuiti® Enhanced Specular Reflection (ESR) film available from 3M Company, St. Paul, Minn. Examples of suitable diffuse reflectors include polymers, such as polyethylene terephthalate (PET), polycarbonate (PC), polypropylene, polystyrene and the like, loaded with diffusely reflective particles, such as titanium dioxide, barium sulphate, calcium carbonate and the like.

An arrangement 120 of light management layers is positioned between the backlight 110 and the front panel assembly 130. The light management layers affect the light propagating from backlight 110 so as to improve the operation of the display device 100. For example, the arrangement 120 of light management layers may include a diffuser plate 122. The diffuser plate 122 is used to diffuse the light received from the light sources, which results in an increase in the uniformity of the illumination light incident on the LC panel 140. Consequently, this results in an image perceived by the viewer that is more uniformly bright.

The arrangement 120 of light management layers may also include a collimating diffuser film 124 and a reflective polarizer 128. The light sources 114 typically produce unpolarized light but the lower absorbing polarizer 132 only transmits a single polarization state, and so about half of the light generated by the light sources 114 is not transmitted through to the LC layer 136. The reflecting polarizer 128, however, may be used to reflect the light that would otherwise be absorbed in the lower absorbing polarizer, and so this light may be recycled by reflection between the reflecting polarizer 128 and the reflector 112. At least some of the light reflected by the reflecting polarizer 128 may be depolarized, and subsequently returned to the reflecting polarizer 128 in a polarization state that is transmitted through the reflecting polarizer 128 and the lower absorbing polarizer 132 to the LC layer 136. In this manner, the reflecting polarizer 128 may be used to increase the fraction of light emitted by the light sources 114 that reaches the LC layer 136, and so the image produced by the display device 100 is brighter.

Any suitable type of reflective polarizer may be used, for example, multilayer optical film (MOF) reflective polarizers; diffusely reflective polarizing film (DRPF), such as continuous/disperse phase polarizers, wire grid reflective polarizers or cholesteric reflective polarizers.

The arrangement 120 of light management layers may also include a light directing film 126. A light directing film is one that includes a surface structure that redirects off-axis light in a direction closer to the axis of the display. This increases the amount of light propagating on-axis through the LC layer 136, thus increasing the brightness of the image seen by the viewer. One example is a prismatic light directing film, which has a number of prismatic ridges that redirect the illumination light, through refraction and reflection.

Unlike diffuser plates and stacked optical films used in conventional LCD-TVs, the present invention uses an arrangement of light management films comprising a polymeric optical diffuser film, which is supported between two outer transparent films exhibiting relatively high dimensional stability, wherein a controlled tensile force is applied to the two outer transparent films. Typically the controlled tensile force is provided via the use of a spring type mechanism protruding through holes or slots in the film. One possible means to provide the controlled tensile force is using tensioning straps as the spring type mechanism that protrude through holes or slots in the film. Other tensioning means can also be employed.

The spring type mechanisms are further secured to a frame which located around the perimeter of the outer transparent films. A "spring type mechanism" is defined here as any mechanism that can substantially maintain a uniform tensile force over a range of motion. That range of motion must be at least as large a distance as the maximum expected change in dimension of the films under the design temperature and humidity ranges. Substantially maintained is defined here as maintaining the tensile force to at least 50% of the original force. Preferably the force can be maintained to at least 75% of the original force. The term film is defined here as a sheet of material that has a thickness of less than 500 um.

Figure 2:
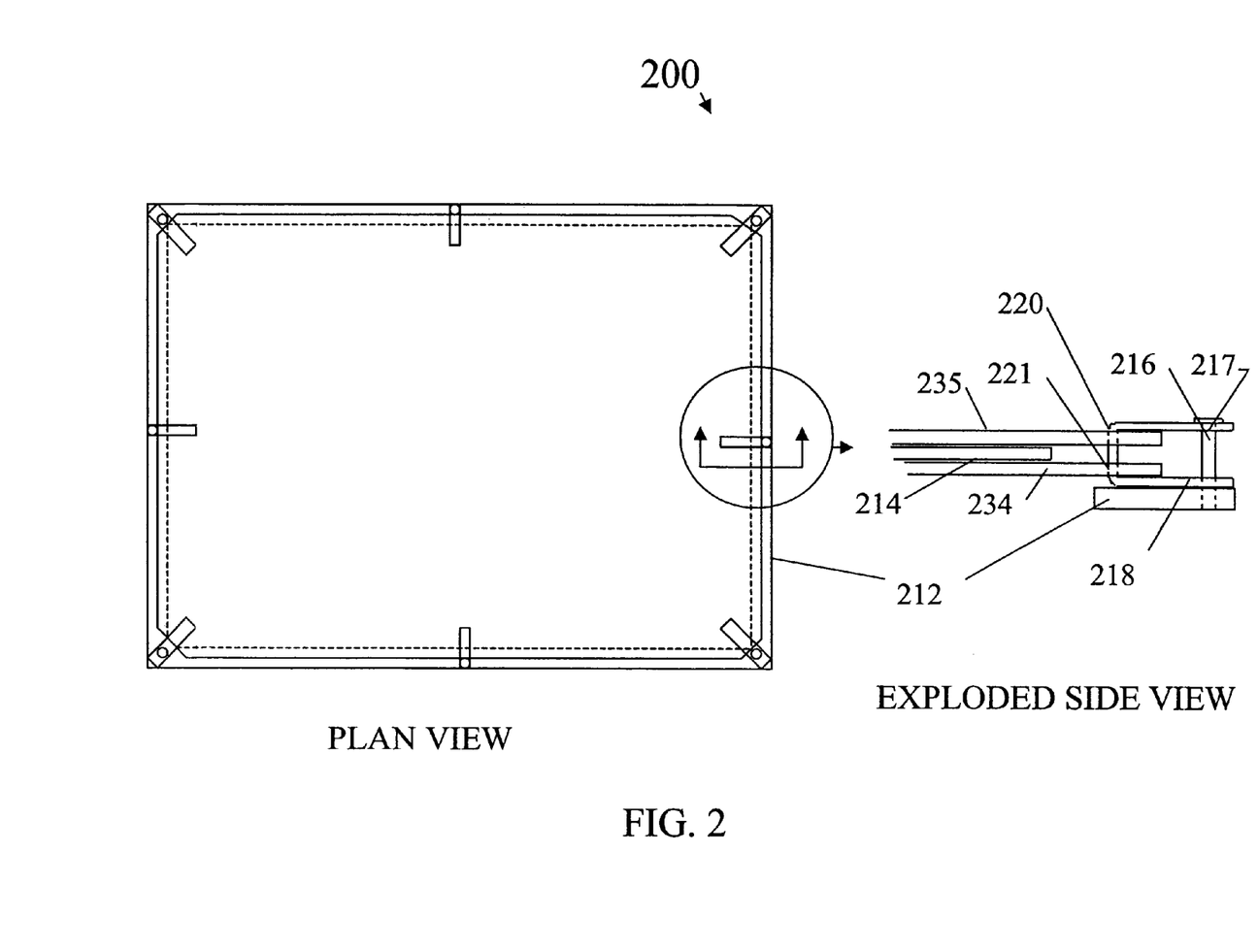
FIG. 2 schematically illustrates an optical element comprising a polymeric optical diffuser film, which is supported between two outer transparent films exhibiting relatively high dimensional stability, wherein a controlled tensile force is applied via tensioned straps to the two outer transparent films but not the inner films according to principles of the present invention. Such an optical element capable of replacing the function of the diffuser plate of FIG. 1.

One exemplary embodiment of the optical element of the present invention is schematically illustrated in FIG. 2. The optical element 200 includes a polymeric optical diffuser film 214 between two transparent films 234 and 235. Transparent is defined here as having a luminous transmission when measured using ASTM D-1003-00 of greater than 70%. The typical thickness range for the outer transparent films is between 50 and 400 um. A supporting frame 212 located around perimeter of the films. Perimeter is defined here as an imaginary continuous line drawn along all thin edges of the films. Typically for LDC displays there are 4 orthogonal edges creating a rectangular perimeter. Other optical films can also be added to the arrangement of light management layers above the polymeric optical diffuser film as will be illustrated in a subsequent figure. FIG. 2 shows one means by which the optical diffuser film 214 is supported by outer transparent films that are themselves supported by a tensile force. A tensioned strap 218 protrudes through slots 220 and 221 in the outer transparent films. A pin 216 protrudes through holes or slots 217 in the tensioned strap 218. The pin 216 is fixed into the frame 212. Many such tensioning straps are placed around the perimeter of the outer transparent films at various locations. Alternatively two tensioned straps 218 can be used and each protruded through slots 220 and 221 of outer transparent films 235 and 234, respectively. In such a case each of the outer transparent films 235 and 234 would be independently tensioned.

The optical diffuser film 214 is supported by the tensioned outer transparent films. The tensioned outer transparent films 234 and 235 are self-supporting. Here self-supporting is defined as maintaining a planar uniformity of the film under the films own weight plus the addition of the weight of any other optical films to be used in the light management arrangement. Planar uniformity is defined as having an out of plane deflection from original position of less than $180^{th}$ of the length of the longest side of the diffuser film.

Transparent is defined here as having a luminous transmission when measured using ASTM D-1003-00 of greater than 70%. The tensioned outer transparent films must have a high degree of dimensional stability in terms of shrinkage, thermal expansion coefficient, and creep. Preferably shrinkage when heated from ambient temperature (23 C) to 85 C should be less than 1.5%.

Thermal shrinkage measurements are performed using samples with dimensions of approximately 35 mm wide by minimum of approximately 6 inches long. Each strip is placed in a punch to obtain a preset 6-inch gauge length. The actual gauge length is measured using a device calibrated with a 6-inch invar bar preset to measure 6-inch samples. This length is recorded to 0.0001 inches using a digital micrometer. Once the initial length is determined, samples are placed in an oven at the prescribed temperature for the necessary time interval (in this case test condition 85 C for 24 hours). Samples are then removed from the oven and placed in a controlled environment set to 23 C and 50% relative humidity for a minimum of approximately 2 hours but generally approximately 24 hours. The final sample length is re-measured using the same setup used to determine the initial length. The shrinkage is reported in percent using the following equation:

$$\text{Percent Linear Change} = \frac{(\text{final value} - \text{initial value}) \times 100}{\text{initial value}}$$

It is noted that the negative (−) sign associated with the shrinkage denotes direction of the change.

The thermal expansion coefficient (at 23° C.) of the tensioned outer transparent films should preferably be less than 4.0E-5 um/um/° C. when measured according to ASTM method D-696.

The tensile creep compliance should preferably be less than $6 \times 10^{-10}$ Pa$^{-1}$ when measured at 23° C. after 20 minutes under a constant tensile load. The tensile creep compliance is measured under a low stress such that the film behaves such that the strain is linearly proportional to the applied stress. The tensile strain is defined by the net change in length divided by the initial length at the start of the measurement. The tensile creep compliance is defined as the tensile strain divided by the applied stress. Film samples are measured in a differential elongational apparatus that is capable of maintaining a low constant load such as less than 50 MPa and is capable of measuring the length of the film specimens to an accuracy of 1 micron.

A film with high dimensional stability is defined here as one that meets the minimum preferred value of shrinkage, thermal expansion coefficient, and creep as described above (1.5%, 4.0E-5 um/um/C, and $6 \times 10^{-10}$ Pa$^{-1}$, respectively).

A film with low dimensional stability is one that does not meet the minimum preferred value of shrinkage, thermal expansion coefficient, and creep as described above (1.5%, 4.0E-5 um/um/C, and $6 \times 10^{-10}$ Pa$^{-1}$, respectively).

Exemplary embodiments of the tensioned outer transparent films 234 and 235 include films comprising a semi-crystalline polymer. A semi-crystalline polymer matrix is preferred as it may be substantially transparent to visible light and can possess dimensional stability having a shrinkage of less than 1.0% after being tested at elevated temperatures up to 85 C. Desirably the tensile creep compliance for the semi-crystalline polymer film is less than $5 \times 10^{-10}$ Pa$^{-1}$ These polymers typically also meet the described criterion above for thermal expansion coefficient. Suitable polymers to meet all these criteria are polyesters and their copolymers. Desirably, these polymers are poly(ethylene terephthalate) (PET); poly(ethylene naphthalate)(PEN)polyesters and any of their copolymers. PET is particularly suitable as it is much lower in cost than PEN.

The diffuser film 214 and one or more other light management layers may be included in a light management arrangement disposed between the backlight and the LCD panel. The tensioned outer transparent films 234 and 235 provide a stable structure for supporting the light management arrangement. The tensioned films are not prone to warping like conventional diffuser plate systems.

Exemplary embodiments of the polymeric optical diffuser film 214 include a semi-crystalline polymer matrix containing voids and void initiating particles. A semi-crystalline polymer matrix is preferred as it may be substantially transparent to visible light, can be readily stretch voided, and can possess dimensional stability having a shrinkage of less than 1.0% after being tested at elevated temperatures up to 85° C. Suitable polymers to meet all these criteria are polyesters and their copolymers. Desirably these polymers are poly(ethylene terephthalate) (PET); poly(ethylene naphthalate)(PEN) polyesters and any of their copolymers. PET is particularly suitable as it is much lower in cost than PEN. When optical diffuser films comprise polymers as just described the optical diffuser film can itself be one of the outer transparent (albeit partially transparent) tensioned films.

Although dimensionally stable films are desirable for the optical diffuser film 214, the present invention enables a broad spectra of polymeric films to be used as this film is typically not held under tension and thus creep is not an issue.

When using a stretch voided optical diffuser film 214, the void initiating particles may be any type of particle that is incompatible with the matrix polymer. These particles can be inorganic or organic. Inorganic particles can include any of calcium carbonate, barium sulfate, titanium dioxide, or any other inorganic compound that can be melt blended into a polymer. Typical organic void initiating particles are polymers that are immiscible with the matrix polymer. These are preferred as resin pellets of these immiscible polymers can be simply dry blended with the resin pellets of the matrix polymer and extruded together to form a cast film. Inorganic particles require a pre-mixing or melt compounding, which adds processing cost. Preferred organic void initiating particles are polyolefins. Most preferred is polypropylene.

The void initiating particles should be added so as to produce enough diffusivity to function as a diffuser yet not be so opaque that the optical luminance of the LCD display is significantly reduced. Preferred loadings of the void initiating particles are 3 to 25 wt % of the entire film. The most preferred loadings are 10 to 20 wt %.

The polymeric optical diffuser 214 is preferably produced by a process of dry blending the matrix polymer and an immiscible polymer additive. Blending may be accomplished by mixing finely divided, e.g. powdered or granular, matrix polymer and polymeric additive and, thoroughly mixing them together, e.g. by tumbling them. The resulting mixture is then fed to the film forming extruder. Blended matrix polymer and immiscible polymeric additive which has been extruded and, e.g. reduced to a granulated form, can be successfully re-extruded into a voided polymeric optical diffuser. It is thus possible to re-feed scrap film, e.g. as edge trimmings, through the process. Alternatively, blending may be effected by combining melt streams of matrix polymer and the immiscible polymer additive just prior to extrusion. If the polymeric additive is added to the polymerization vessel in which the matrix polymer is produced, it has been found that voiding and hence diffusivity is not developed during stretching. This is thought to be on account of some form of chemical or physical bonding which may arise between the additive and matrix polymer during thermal processing.

The extrusion, quenching and stretching of the voided polymeric optical diffuser film may be effected by any process which is known in the art for producing oriented film, e.g. by a flat film process or a bubble or tubular process. The flat film process is preferred for making voided polymeric optical diffuser according to this invention and involves extruding the blend through a slit die and rapidly quenching the extruded web upon a chilled casting drum so that the matrix polymer component of the film is quenched into the amorphous state. The film base is then biaxially oriented by stretching in mutually perpendicular directions at a temperature above the glass-rubber transition temperature of the matrix polymer. Generally the film is stretched in one direction first and then in the second direction although stretching may be effected in both directions simultaneously if desired. In a typical process the film is stretched firstly in the direction of extrusion over a set of rotating rollers or between two pairs of nip rollers and is then stretched in the direction transverse thereto by means of a tenter apparatus. The film may be stretched in each direction to 2.5 to 5.0 times its original dimension in each direction of stretching. Upon stretching voids initiate around the void initiating particles. The higher the concentration of void initiating particle the higher the degree of void volume that is produced. The final stretched thickness of the film is preferably in the 25.0 to 250.0 um thickness range. The most preferred thickness range is between 50.0 and 150.0 um. This is significantly thinner than the optically transmissive self-supporting substrate and together their total thickness can be maintained in the range of that of the currently used plate diffusers.

After the film has been stretched and a voided polymeric optical diffuser film formed, it is heat set by heating to a temperature sufficient to crystallize the matrix polymer whilst restraining the voided polymeric optical diffuser against retraction in both directions of stretching. This process enables the film to meet shrinkage requirements of less than 1.0% when tested at temperatures up to 85° C. The voiding tends to collapse as the heat setting temperature is increased and the degree of collapse increases as the temperature increases. Hence specular light transmission increases with an increase in heat setting temperatures. Whilst heat setting temperatures up to about 230° C. can be used without destroying the voids, temperatures between 150° C. and 200° C. generally result in a greater degree of voiding and more efficient diffusivity, as well as result in low shrinkage after thermal testing.

The polymeric optical diffuser film 214 may also include a whitener. Typically whiteners are added at levels much lower than void initiators and thus do not contribute to voiding but do improve whiteness and to some extent diffusivity of the film. Whiteners are typically inorganic compounds, TiO2 being most preferred. These optical brighteners can be added to the film during the resin blending process and can be added via master batch pellets at the appropriate ratio. The appropriate ratio is that that would let down the concentration of the master batch pellet with the rest of the matrix resin and void initiating resin to a concentration preferably between 0.25 and 5.0 wt %.

The polymeric optical diffuser film 214 may also include optical brighteners that convert UV light into visible light. Such optical brighteners must be chosen from those which are thermally stable and can survive the extrusion temperatures used to fabricate the voided polymeric optical diffuser film.

Preferred optical brighteners comprise benzoxazolyll-stilbene compounds. The most preferred optical brightener comprises 2,2'-(1,2-ethenediyldi-4,1-phenylene)bisbenzoxazole. These optical brighteners can be added to the film during the resin blending process and can be added via master batch pellets at the appropriate ratio. The appropriate ratio is that that would let down the concentration of the master batch pellet with the rest of the matrix resin and void initiating resin to a concentration preferably between 0.01 and 0.1 wt %. In the most preferred embodiment the optical brightener will be added to attain a concentration between 0.02 and 0.05% wt.

The polymeric optical diffuser film 214 may also include an antistatic coating to prevent dirt attraction. Anyone of the known antistatic coatings could be employed.

The polymeric optical diffuser film 214 may also be fabricated as a multilayered or coextruded film. Advantages of doing so would be to enable the use of a very thin film yet still meet both optical and thermal stability or shrinkage requirements. Thin films require high loadings of void initiator and thus high voiding to achieve the optical diffusion performance of a plate diffuser. At these high levels of voiding the film is much less dimensionally stable at elevated temperatures. By creating a film with a non-voided layer adjacent to one or both sides of a voided layer the dimensional stability at elevated temperatures can be improved. Such multilayered films are produced the same as previously discussed except a second extruder is used to melt and pump neat matrix polymer. This neat polymer extrusion flow is delivered along with the voided layer extrusion flow, previously described, into a co-extrusion die assembly. A multilayered cast film is then produced with a layer of neat polymer on one or both sides of the voided layer. This cast film is then quenched and stretched as previously discussed.

The optical diffuser film 214 may be provided with protection from ultraviolet (UV) light, for example by including UV absorbing material or material in one of the layers that is resistant to the effects of UV light. Suitable UV absorbing compounds are available commercially, including, e.g., Cyasorb® UV-1164, available from Cytec Technology Corporation of Wilmington, Del., and Tinuvin® 1577, available from Ciba Specialty Chemicals of Tarrytown, N.Y.

Other materials may be included in the optical diffuser film 214 to reduce the adverse effects of UV light. One example of such a material is a hindered amine light stabilizing composition (HALS). Generally, the most useful HALS are those derived from a tetramethyl piperidine, and those that can be considered polymeric tertiary amines. Suitable HALS compositions are available commercially, for example, under the "Tinuvin" trade name from Ciba Specialty Chemicals Corporation of Tarrytown, N.Y. One such useful HALS composition is Tinuvin 622.

The optical element 200 of FIG. 2 can be used in place of the diffuser plate of conventional LCD displays.

Figure 3:
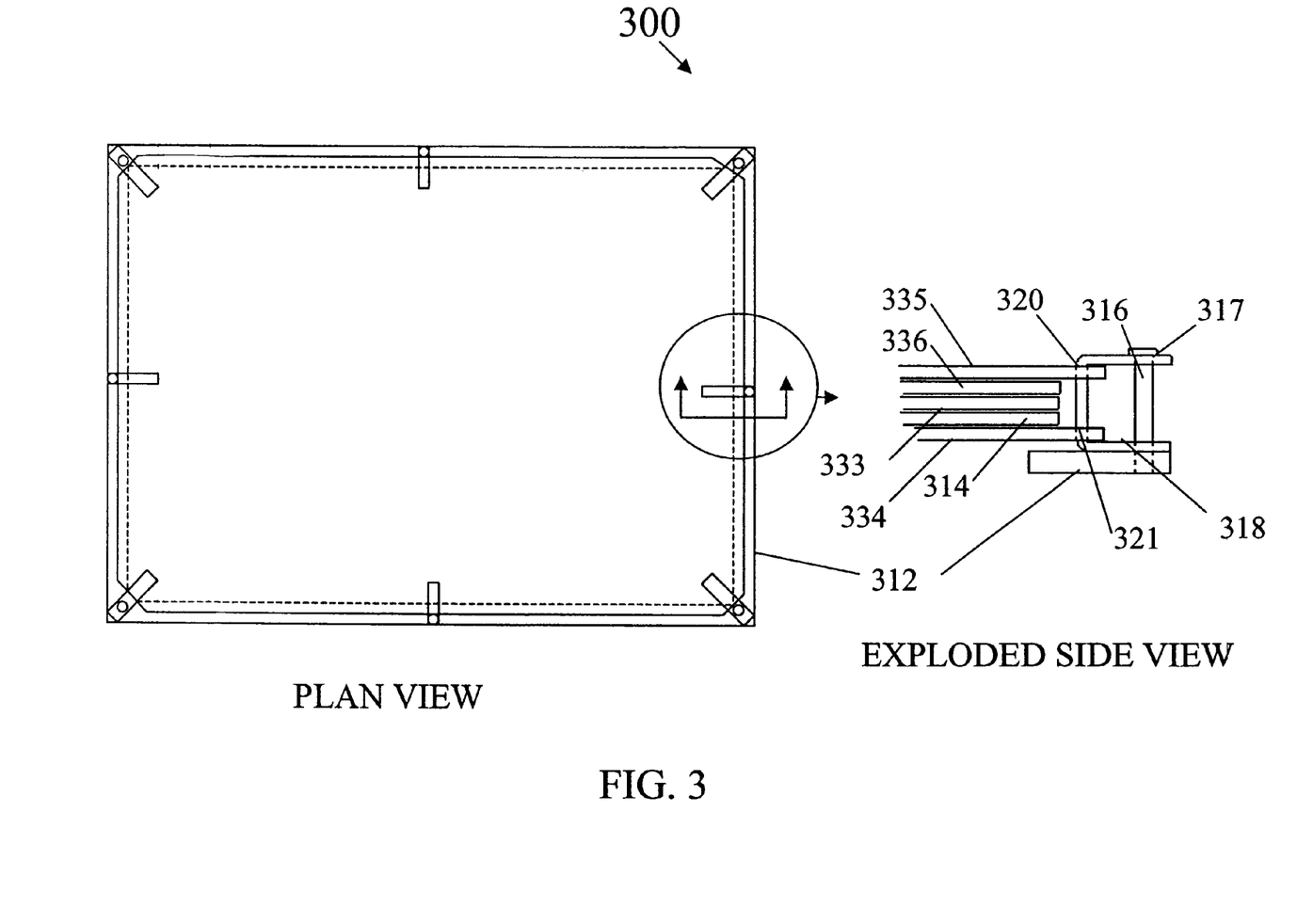
FIG. 3 schematically illustrates an optical element comprising an optical diffuser film, a bead coated collimating diffuser film, and a light directing film inserted between two outer transparent films exhibiting relatively high dimensional stability, wherein a controlled tensile force is applied via tensioned straps to the two outer transparent films but not the inner films such that the optical element is a unitary component that comprises the entire light management film arrangement for an LCD display.

Another exemplary embodiment of the present invention is schematically illustrated in FIG. 3. The optical element 300 is an arrangement of light management films which includes a polymeric optical diffuser film 314 and a supporting frame 312 located around the perimeter of the film. The frame 312 can be a separate entity that is provided to the producers of LCD's along with the films or can be the existing frame in a conventional LCD backlight. Other optical films are also added to the arrangement of light management layers above the polymeric optical diffuser film. A bead coated collimation diffuser film 333 is placed adjacent to the polymeric optical diffuser film 314. A light directing film 336 is placed adjacent to the bead coated collimation diffuser film 333, opposite the optical diffuser film 314. FIG. 3 shows how optical diffuser film 314, the bead coated collimation diffuser film 333, and the light directing film 336 are supported by tensioned outer transparent films 334 and 335. In this means both the outer transparent films 334 and 335 are themselves supported by a tensile force. Tensioned strap 318 protrudes through slots 320 and 321 in both the outer transparent films 335 and 334, respectively. The tensioned strap can comprise any elastic material (that is, a material that substantially recovers its original shape when a deforming force is removed). Preferred materials are elastomers. Preferred elastomers are those that maintain performance for their lifetime when used in an LCD under design temperatures of 85 C. Such elastomers include crosslinked: Polyurethanes, Silicone rubbers, Polychloroprene, Ethylene-propylene copolymer, Ethylene-propylene terpolymer, Vinylidene fluoride-chloro-trifluoro ethylene random copolymer, Vinylidene fluoride-chloro-hexa fluoro ethylene random copolymer, High-Strength Buna-N Rubber, and others. These elastomers may be reinforced with inorganic fillers such as talc, glass fibers, and other well known elastomer reinforcing additives. The use of stabilizers and environmental protective agents, such as antioxidants and UV stabilizers, in these elastomers is commonly known and can be used to further improve the performance over the life of an LCD. A pin 316 protrudes through holes 317 in each end of the tensioned strap. The pin 316 is fixed into the frame 312 located around the perimeter of the films. At least 4 such tensioned straps and pins as 318 and 316, respectively, are located around the perimeter of the films. The optical films 314, 333, and 336 are constrained normal to its surface by the two tensioned outer transparent films which they are sandwiched between. Other optical films can also be constrained normal to their surfaces if placed between the two tensioned outer transparent films. The optical element 300 of FIG. 3 can be used in place of the diffuser plate and the optional optical films of conventional LCD displays.

In any embodiment where more than one optical film is constrained by the tensioned outer transparent films (as in FIG. 3) typically none of the optical films are adhered to each other. There may be benefit for two optical films to be adhered to each other from a cost of manufacturing standpoint but typically one or more of the optical films are not adhered to each other.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the claims.

The entire contents of the patents and other publications referred to in this specification are incorporated herein by reference.

PARTS LIST 100 direct-lit LC display device
110 backlight
112 reflector
114 light sources
120 light management layers
122 diffuser plate
124 collimating diffuser film
126 light directing film
128 reflective polarizer
130 front LC panel assembly
132 lower absorbing polarizer 134 panel plates
136 LC layer
138 upper absorbing polarizer
139 optional layer(s)
140 LC panel
150 controller
200 optical element
212 supporting frame
214 polymeric optical diffuser film
216 pin
217 slot or hole
218 tensioned strap (spring)
220 slot
221 slot
234 transparent tensioned film
235 transparent tensioned film
300 optical element
312 supporting frame
314 polymeric optical diffuser film
316 pin
317 hole in tensioned strap
318 tensioned strap
320 slot or hole in outer transparent film
321 slot or hole in outer transparent film
333 collimation diffuser film
334 transparent tensioned film
335 transparent tensioned film
336 light directing film

The invention claimed is:

1. An optical element comprising a stack of at least three juxtaposed films with at least one inner optical film and two outer transparent films exhibiting high dimensional stability, wherein a controlled tensile force is applied in at least one direction to the two outer films but not the at least one inner film; and
comprising an optical diffuser film comprising voids.

2. The optical element of claim 1 wherein at least one inner film has low dimensional stability.

3. The optical element of claim 1 wherein the tensile force is applied by mechanisms at various locations around the perimeter of the two outer transparent films.

4. The optical element of claim 3 wherein the tensile force is applied in a direction perpendicular to the edge of the film nearest the applied location.

5. An optical element comprising a stack of at least three juxtaposed films with at least one inner optical film and two outer transparent films exhibiting high dimensional stability, wherein a controlled tensile force is applied in at least one direction to the two outer films but not the at least one inner film, wherein the tensile force is provided from a tensioning mechanism comprising an elongated structure which protrudes through the holes or slots in the two outer transparent films and has at least one surface that is normal to the direction of the tensile force.

6. An optical element comprising a stack of at least three juxtaposed films with at least one inner optical film and two outer transparent films exhibiting high dimensional stability, wherein a controlled tensile force is applied in at least one direction to the two outer films but not the at least one inner film wherein the tensile force can be substantially maintained for each mechanism over the expected film dimensional change for the design temperature and humidity range of the optical element and wherein the maximum change in applied tensile force for each mechanism is less than 50% of the highest force over the expected film dimensional change for the design temperature and humidity range of the optical element.

7. An optical element comprising a stack of at least three juxtaposed films with at least one inner optical film and two outer transparent films exhibiting high dimensional stability, wherein a controlled tensile force is applied in at least one direction to the two outer films but not the at least one inner film wherein the tensile force can be substantially maintained for each mechanism over the expected film dimensional change for the design temperature and humidity range of the optical element and wherein the maximum change in applied tensile force is less than 25% of the highest force over the expected film dimensional change for the design temperature and humidity range of the optical element.

8. The optical element of claim 1 wherein the mechanism is a spring mechanism.

9. The optical element of claim 1 wherein the mechanism includes a supporting frame around the perimeter of the 3 juxtaposed films.

10. The optical element of claim 9 wherein at least one spring type mechanism connects the two outer transparent films to the frame.

11. The optical element of claim 1 comprising an optical diffuser film and a light directing film.

12. The optical element of claim 11 further comprising a bead coated collimating diffuser.

13. The optical element of claim 12 further comprising a reflective polarizer film.

14. An optical element comprising two outer transparent films wherein at least a portion of the outer transparent films is maintained dimensionally stable by the presence of a mechanism for application of a controlled tensile force to the films wherein the maximum change in applied tensile force for each mechanism is less than 50% of the highest force over the expected film dimensional change for the design temperature and humidity range of the optical element.

15. An optical element comprising a stack of at least three juxtaposed films with at least one inner optical film and two outer transparent films exhibiting high dimensional stability, wherein a controlled tensile force is applied in at least one direction to the two outer films but not the at least one inner film wherein the tensile force is provided by a tensioning mechanism comprising a tensioning strap protruding through holes or slots in the outer transparent films.

16. The optical element of claim 1 where in the tensile force is applied through a frame that is part of a backlight unit.

17. The optical element of claim 1 wherein the at least 1 inner optical film is restrained normal to the film surface by the two outer transparent films that are maintained dimensionally stable by the presence of a mechanism for application of a controlled tensile force.

18. The optical element of claim 15 wherein the strap comprises an elastic material.

19. The optical element of claim 18 wherein the strap comprises an elastomer.

20. The optical element of claim 19 wherein the elastomer comprises a Polyurethanes, Silicone rubbers, Polychloroprene, Ethylene-propylene copolymer, Ethylene-propylene terpolymer, Vinylidene fluoride-chloro-trifluoro ethylene random copolymer, Vinylidene fluoride-chloro-hexa fluoro ethylene random copolymer, and High-Strength Buna-N Rubber.

21. The optical element of claim 20 wherein the elastomer further comprises stabilizers or environmental protective agents.

22. The optical element of claim 1 wherein the outer transparent films are between 50 and 400 um in thickness.

* * * * *